(12) United States Patent
Masel et al.

(10) Patent No.: US 7,282,282 B2
(45) Date of Patent: Oct. 16, 2007

(54) ORGANIC FUEL CELLS AND FUEL CELL CONDUCTING SHEETS

(75) Inventors: Richard I. Masel, Champaign, IL (US); Su Ha, Champaign, IL (US); Brian Adams, Savoy, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 347 days.

(21) Appl. No.: 10/664,772

(22) Filed: Sep. 17, 2003

(65) Prior Publication Data

US 2004/0115518 A1 Jun. 17, 2004

Related U.S. Application Data

(63) Continuation-in-part of application No. 10/407,385, filed on Apr. 4, 2003, now Pat. No. 7,132,188.

(60) Provisional application No. 60/369,992, filed on Apr. 4, 2002.

(51) Int. Cl.
  H01M 8/00 (2006.01)
  H01M 2/00 (2006.01)
  H01M 2/14 (2006.01)
(52) U.S. Cl. ............................. 429/12; 429/34; 429/38
(58) Field of Classification Search ................ 429/12, 429/25, 34, 38
See application file for complete search history.

(56) References Cited

U.S. PATENT DOCUMENTS

| 3,198,666 A | 8/1965 | Gruneberg et al. |
| 3,297,487 A | 1/1967 | Pomeroy et al. |
| 3,506,494 A | 4/1970 | Adlhart |
| 3,711,385 A | 1/1973 | Beer |
| 4,039,409 A | 8/1977 | LaConti et al. |
| 4,081,409 A | 3/1978 | McNicol et al. |
| 4,127,468 A | 11/1978 | Alfenaar et al. |
| 4,431,750 A | 2/1984 | McGinnis et al. |
| 4,447,506 A | 5/1984 | Luczak et al. |
| 4,457,823 A | 7/1984 | LaConti et al. |
| 4,457,986 A | 7/1984 | Bindra et al. |

(Continued)

FOREIGN PATENT DOCUMENTS

GB 1273045 5/1972

(Continued)

OTHER PUBLICATIONS

Ha et al., "Methanol Conditioning for Improved Performance of Formic Acid Fuel Cells," J. Power Source 112 655-59 (2002).*

(Continued)

*Primary Examiner*—Dah-Wei Yuan
(74) *Attorney, Agent, or Firm*—Greer, Burns & Crain, Ltd.

(57) ABSTRACT

A passive direct organic fuel cell includes an organic fuel solution and is operative to produce at least 15 $mW/cm^2$ when operating at room temperature. In additional aspects of the invention, fuel cells can include a gas remover configured to promote circulation of an organic fuel solution when gas passes through the solution, a modified carbon cloth, one or more sealants, and a replaceable fuel cartridge.

19 Claims, 7 Drawing Sheets

U.S. PATENT DOCUMENTS

| | | | |
|---|---|---|---|
| 4,478,917 | A | 10/1984 | Fujita et al. |
| 4,493,878 | A | 1/1985 | Horiba et al. |
| 4,797,380 | A | 1/1989 | Motoo et al. |
| 4,806,515 | A | 2/1989 | Luczak et al. |
| 4,822,699 | A | 4/1989 | Wan et al. |
| 5,004,424 | A | 4/1991 | Larminie |
| 5,024,905 | A | 6/1991 | Itoh et al. |
| 5,096,866 | A | 3/1992 | Itoh et al. |
| 5,183,713 | A | 2/1993 | Kunz |
| 5,208,207 | A | 5/1993 | Stonehart et al. |
| 5,225,391 | A | 7/1993 | Stonehart et al. |
| 5,246,791 | A | 9/1993 | Fisher et al. |
| 5,364,711 | A | 11/1994 | Yamada et al. |
| 5,393,619 | A | 2/1995 | Mayer et al. |
| 5,599,638 | A | 2/1997 | Surampudi et al. |
| 5,773,162 | A | 6/1998 | Surampudi et al. |
| 5,856,036 | A | 1/1999 | Smotkin et al. |
| 5,885,729 | A | 3/1999 | Marchetti |
| 5,898,113 | A * | 4/1999 | Vecere .................... 73/864.62 |
| 5,904,740 | A * | 5/1999 | Davis ......................... 44/385 |
| 6,007,934 | A | 12/1999 | Auer et al. |
| 6,020,083 | A | 2/2000 | Breault et al. |
| 6,146,782 | A | 11/2000 | Wendt et al. |
| 6,165,635 | A | 12/2000 | Auer et al. |
| 6,248,460 | B1 | 6/2001 | Surampudi et al. |
| 6,284,402 | B1 | 9/2001 | Mallouk et al. |
| 6,326,098 | B1 | 12/2001 | Itoh et al. |
| 6,387,557 | B1 | 5/2002 | Krasij et al. |
| 6,432,284 | B1 | 8/2002 | Narayanan et al. |
| 6,447,941 | B1 | 9/2002 | Tomimatsu et al. |
| 6,458,479 | B1 | 10/2002 | Ren et al. |
| 6,492,052 | B2 | 12/2002 | Ren |
| 6,492,147 | B2 | 12/2002 | Imamura et al. |
| 6,495,278 | B1 | 12/2002 | Schmid et al. |
| 6,498,121 | B1 | 12/2002 | Gorer |
| 6,517,965 | B1 | 2/2003 | Gorer |
| 6,533,827 | B1 | 3/2003 | Cisar et al. |
| 6,649,300 | B2 | 11/2003 | Ito et al. |
| 6,660,680 | B1 | 12/2003 | Hampden-Smith et al. |
| 6,670,301 | B2 | 12/2003 | Adzic et al. |
| 6,686,308 | B2 | 2/2004 | Mao et al. |
| 6,723,678 | B2 | 4/2004 | Gorer |
| 6,770,394 | B2 | 8/2004 | Appleby et al. |
| 6,924,055 | B2 * | 8/2005 | Hirsch et al. ................. 429/34 |
| 2003/0170508 | A1 * | 9/2003 | Beckmann et al. ............ 429/13 |
| 2003/0198852 | A1 * | 10/2003 | Masel et al. ................... 429/30 |
| 2004/0115518 | A1 | 6/2004 | Masel et al. |

FOREIGN PATENT DOCUMENTS

| | | |
|---|---|---|
| GB | 1292791 | 10/1972 |
| JP | 01227361 A | 9/1989 |

OTHER PUBLICATIONS

Weber, M.; Wang, J.T.; Wasmus, S; Savinell, R.F.; "Formic Acid Oxidation in a Polymer Electrolyte Fuel Cell: A Real-Time Mass-Spectrometry Study," J. Electochem. Soc., 1996, 143(7), L158-l160.

M. Watanabe, "Electrocatalysis By Ad-Atoms, Part XIII. Preparation of Ad-Electrodes with Tin Ad-Atoms for Methanol, Formaldehyde and Formic Acid Fuel Cells", J. Electroanal. Chem, 191, Dec. 1985, p. 367-375.

M. Watanabe, "Electrocatalysis By Ad-Atoms, Part XXIII. Design of Platinum Ad-Electrodes for Formic Acid Fuel Cells with Ad-Atoms of the IVth and the Vth Groups," J. Electroanal. Chem, 250, Feb. 1988, p. 117-125.

Papageorgopoulos, D. et al.; "CO Tolerance of Pd Rich Platinum Carbon Supported Electrocatalysts fro PEMFC Applications", Journal of the Electrochemical Society, in press, Aug. 2002, pp. 1-22.

Adzic, R. et al.: "Structural Effects in Electrocatalysis", J. Electroanal. Chem., 1983, pp. 79-88.

Avramov-Ivic, M. et al.; "The electrocatalytic properties of the oxides of noble metals in the electrooxidation of methanol and formic acid", Electrochimica Acta, 2001, pp. 3175-3180.

Baldauf, M. et al.; "Formic Acid Oxidation on Ultrathin Pd Films on Au(hkl) and Pt(hkl) Electrodes", J. Phys. Chem., 1996, pp. 11375-11381.

Becerik, I. et al.; "Electro-oxidation of Formic Acid on Highly Dispersed Platinum and Perchlorate Doped Polypyrrole Electrodes", Journal of The Electrochemical Society, 2001, pp. D49-D54.

Capon, A. et al.; "The Effect of Strong Acid on the Reactions of Hydrogen And Oxygen on the Noble Metals a Study Using Cyclic Voltammetry and a New Teflon Electrode Holder", Electroanalytical Chemistry and Interfacial Electrochemistry, 1972, pp. 275-286.

Capon, A. et al.; "The Oxidation of Formic Acid on Noble Metal Electrodes II. A Comparison Of the Behaviour of Pure Electrodes", Electroanalytical Chemistry and Interfacial Electrochemistry, 1973, pp. 239-254.

Capon, A. et al.; "The Oxidation of Formic Acid on Noble Metal Electrodes III. Intermediates and Mechanism on Platinum Electrodes", Electroanalytical Chemistry and Interfacial Electrochemistry, 1973, pp. 205-231.

Capon, A. et al.; "The Oxidation of Formic Acid on Noble Metal Electrodes IV. Platinum and Palladium Electrodes", Electroanalytical Chemistry and Interfacial Electrochemistry, 1975, pp. 285-305.

Chi, N. et al.; "Electrocatalytic oxidation of formic acid by Pt/Co nanoparticles", Catalysis Letters vol. 71, No. 1-2, 2001, pp. 21-26.

Clavilier, J. et al.; "Heterogeneous electrocatalysis on well defined platinum surfaces modified by controlled amounts of irreversibly absorbed adatoms", J. Electroanal. Chem., 1989, pp. 89-100.

Climent, V. et al.; "Electrocatalysis of formic acid and CO oxidation on antimony-modified Pt(111) electrodes", Electrochimica Chemistry, 1993, pp. 1403-1414.

El-Shafei, A. et al.; "Electrocatalytic oxidation of formic acid on Pt binary and ternary electrodes in $H_3PO_4$", Journal of Electroanalytical Chemistry, 1993, pp. 159-165.

El-Shafei, A.; "Study of nickel upd at a polycrystalline Pt electrode and its influence on HCOOH oxidation in acidic and nearly neutral media", Journal of electroanalytical Chemistry, 1998, pp. 81-89.

Fernandez-Vega, A. et al.; "Heterogeneous electrocatalysis on well defined platinum surfaces modified by controlled amounts of irreversibly absorbed adatoms", J. Electroanal. Chem., 1989, pp. 101-113.

Gonzalez, M.J. et al.; "Electrocatalytic Oxidation of Small Carbohydrate Fuels at Pt-Sn Modified Electrodes", J. Phys. Chem. 1998, pp. 9881-9890.

Ha, S. et al.; "A miniature air breathing direct formic acid fuel cell", Journal of Power Sources, 2004, pp. 119-124.

Ha, S. et al.; "Methanol conditioning for improved performance of formic acid fuel cells", Journal of Power Sources, 2002, pp. 655-659.

Harmsen, J. et al.; "Kinetic modeling for wet air oxidation of formic acid on a carbon supported platinum catalyst", Applied Catalysis, 1997, pp. 499-509.

Hartung, T. et al.; "Catalytic Effects of Hg an Ti Submonolayers on the Electrooxidation of Formic Acid on Pt", J. Electroanal. Chem., 1986, pp. 135-149.

Herrero, E. et al.; "Oxidation of formic acid on Pt(111) electrodes modified by irreversibly absorbed tellurium", Journal of Electroanalytical Chemistry, 1995, pp. 161-167.

Herrero, E. et al.; "Oxidation of formic acid on Pt(100) electrodes modified by irreversibly absorbed tellurium", Journal of Electroanalytical Chemistry, 1995, pp. 145-154.

Jiang, J. et al.; "Nanostructured platinum as an electrocatalyst for the electrooxidation of formic acid", Journal of Electroanalytical Chemistry, 2002, pp. 64-70.

Beden, B. et al.; "Electrocatalytic Activity of Noble Metals for the Oxidation of Formate in Neutral Medium", J. Electroanal. Chem., 1979, pp. 127-131.

Llorca, M. et al.; "Formic acid oxidation on $Pd_{ad}$ +Pt(100) and $Pd_{ad}$ + Pt(111) electrodes", Journal of Electroanalytical Chemistry, 1994, pp. 151-160.

Llorca, M. et al.; "Formic acid oxidation on Pt(111) electrodes modified by irreversibly absorbed selenium", *Journal of electroanalytical Chemistry*, 1994, pp. 217-225.

McGovern, M. et al.; "Effects of Nafion as a binding agent for unsupported nanoparticle catalysts", *Journal of Power Sources*, 2003, pp. 35-39.

Shen, P. et al.; "Performance of CO-electrodeposited Pt-Ru/WO$_3$ electrodes for the electrooxidation of formic acid at room temperature", *Journal of Electroanalytical Chemistry*, 1995, pp. 223-225.

Waszczuk, P. et al.; "A nanoparticle catalyst with superior activity for electrooxidation of formic acid", *Electrochemistry Communications*, 2002, pp. 599-603.

Rhee, Y. et al.; "Crossover of formic acid Nafion® membranes", *Journal of Power Sources*, 2003, pp. 35-38.

Pron'kin, S. et al.; "Nanoparticle of Pt hydrosol immobilized on Au support: an approach to the study of structural effects in electrocatalysis", *Electrochimica Acta*, 2001, pp. 2343-2351.

Rice, C. et al.; "Catalysts for direct formic acid fuel cells", *Journal of Power Sources*, 2003, pp. 229-235.

Rice, C. et al.; "Direct formic acid fuel cells", *Journal of Power Sources*, 2002, pp. 83-89.

Gasteiger, H. et al.; "Electro-Oxidation of Small Organic Molecules on Well-Characterized Pt-Ru Alloys", *Electrochimica Acta*, vol. 39, No. 11/12, 1994, pp. 1825-1832.

Smith, S. et al.; "Structural effects on the oxidation of HCOOH by bismuth modified Pt(111) electrodes with (110) manatomic steps", *Journal of Electroanalytical Chemistry*, 1999, pp. 43-49.

Shibata, M. et al.; "Electrocatalysis by Ad-Atoms" Part XXII.: $S_{hole}$ Control By Ad-Atoms on HCOOH Oxidation, *J. Electroanal Chem.*, 1988, pp. 253-264.

Chen, M. et al.; "Enhancement of the electrochemical oxidation of formic acid. Effects of anion absorption and variation of rotation rate", *Electrochimica Acta*, 2001, pp. 3481-3492.

Beltowska-Brzezinska M. et al.; "The Influence of Upd-Lead on the Absorption of Formaldehyde, Formic Acid and Methanol on Pt In Acid Solution", *Electrochimica Acta*, vol. 30, No. 11, 1985, pp. 1465-1471.

Xia, X.; "New insights into the influence of upd Sn on the oxidation of formic acid on platinum in acidic solution", *Electrochimica Acta*, 1999, pp. 1057-1066.

Xiang, J. et al.; "Investigation of the mechanism of the electrochemical oxidation of formic acid at a gold electrode in sulfuric acid solution", *Journal of Electroanalytical Chemistry*, 2001, pp. 95-100.

Yang, Y. et al.; "Surface modification and electrocatalytic properties of Pt(100), Pt(110), Pt(320) an Pt(331) electrodes with Sb towards HCOOH oxidation", *Electrochimica Acta*, 2001, pp. 4339-4348.

Sobkowski, J. et al.; "The Behaviour of Formic Acid on a Rhodium Electrode", *J. Electroanal. Chem.*, 1978, pp. 309-320.

Zhang, X. et al.; "Electrocatalytic Oxidation of Formic Acid on Ultrafine Palladium Particles Supported on a Glassy Carbon", *Electrochimica Acta*, vol. 40, No. 12, 1995, pp. 1889-1897.

Zhu, Y. et al.; "High power density direct formic acid fuel cells", *Journal of Power Sources*, 2004, pp. 8-14.

Guo-Qiang Lu, Alechia Crown, and Andrzej Wieckowski, "Formic Acid Decomposition on Polycrystalline Platinum and Palladized Platinum Electrodes," J. Phys. Chem. B 1999, 103, pp. 9700-9711.

P. Waszczuk, J. Solla-Gullón, H.S. Kim, Y.Y. Tong, V. Montiel, A. Aldaz, and A. Wieckowski, "Methanol Electrooxidation on Platinum/Ruthenium Nanoparticle Catalysts," Journal of Catalysis 203, pp. 1-6 (2001).

Gdowski, G.E.; Fai, J.A.; Maxid, R.J.; Reactive Scattering of Small Molecules from Platinum Crystal Surfaces: $D_2CO$, $CH_3$, $CH_3OH$, HCOOH and the Nonanomalous Kinetics of Hydrogen Atom Recombination, Surf. Sci., 1983, 127(3) 541-54.

A. Wieckowski and R. I. Masel, , "UHV and electrochemical studies of CO and methanol adsorbed at platinum/ruthenium surfaces, and reference to fuel cell catalysis," Electrochimica Acta 47, 22-23, 3637-3652 (2002).

N. Markovic, H. Gasteiger, P. Ross, X. Jiang, I. Villegas and M. Weaver, "Electro-oxidation mechanisms of methanol and formic acid on Pt-Ru alloy surfaces," Electrochimica Acta, 40, 91-98, (1995).

M. Arenz, V. Stamenkovic, T. J. Schmidt, K. Wandelt, P. N. Ross and N. M. Markovic, "The electro-oxidation of formic acid on Pt Pd single crystal bimetallic surfaces," Physical Chemistry Chemical Physics, 5, 4242, (2003).

N. Watanabe, K. Iwatsu, A. Yamakata, T. Ohtani, J. Kubota, J. N. Kondo, A. Wada, K. Domen and C. Hirose, "SFG study of formic acid on a Pt(110)-(1×2) surface," Surf. Sci., 651, 357-358, (1996).

S. W. Jorgensen and R. J. Madix,, "Active oxygen on Group VIII metals: activation of formic acid and formaldehyde on Pd(100)," J. Am. Chem. Soc., 110, 397, (1988).

F. Solymosi and I. Kovacs, "Adsorption and reaction of HCOOH on K-promoted Pd(100) surfaces," Surf. Sci., 259, 95, (1991).

C. Xu and D. W. Goodman, "Adsorption and Reaction of Formic Acid on a Pseudomorphic Palladium Monolayer on Mo(110)," J. Phys. Chem., 100, 245, (1996).

\* cited by examiner

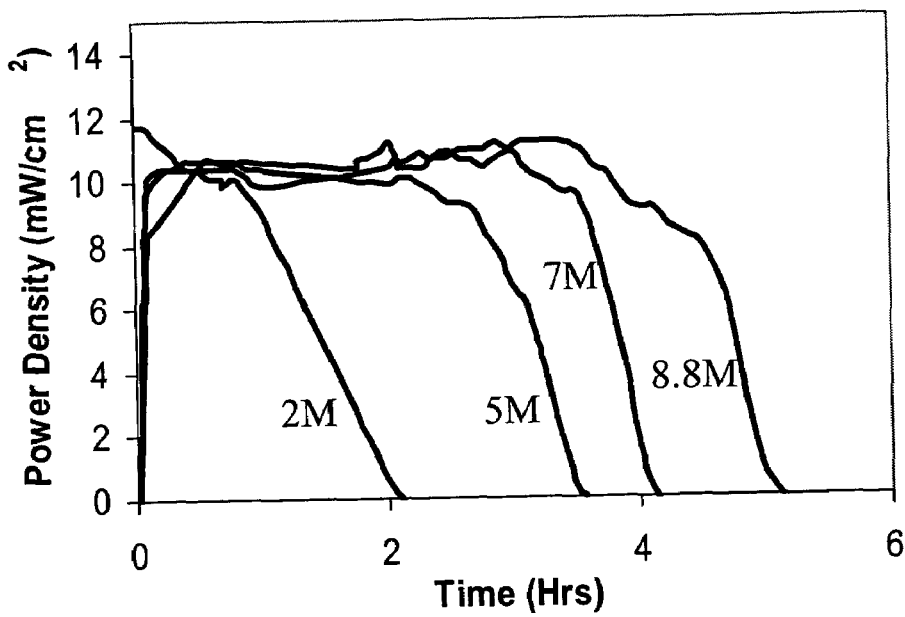
FIG. 2 - Performance of Exemplary Fuel Cell 1 using Differing Formic Acid Concentrations.
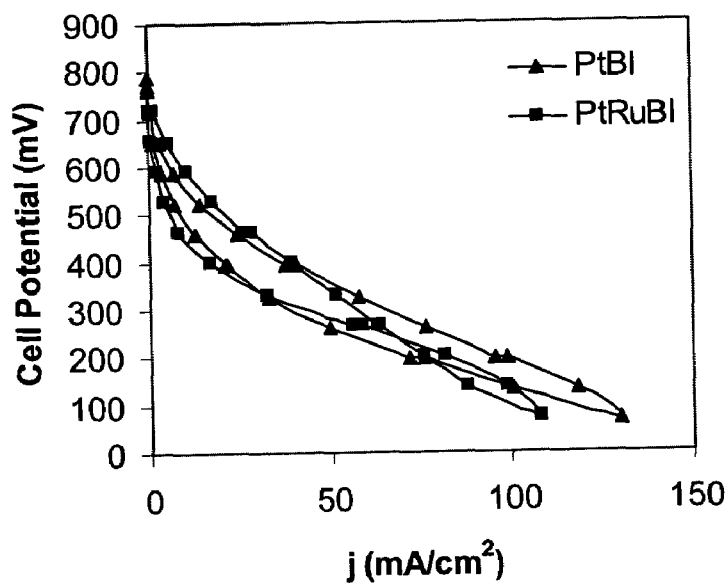
FIG. 3 Comparison of Anode Catalyst Performance with 1.8 M Formic Acid Fuel Solution

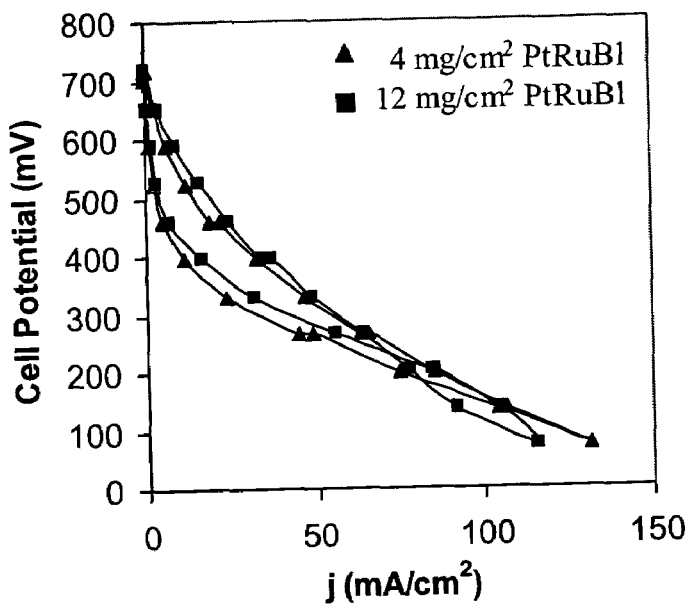
FIG. 4 Comparison of Anode Catalyst Loadings Performance with 1.8 M Formic Acid Fuel Solution
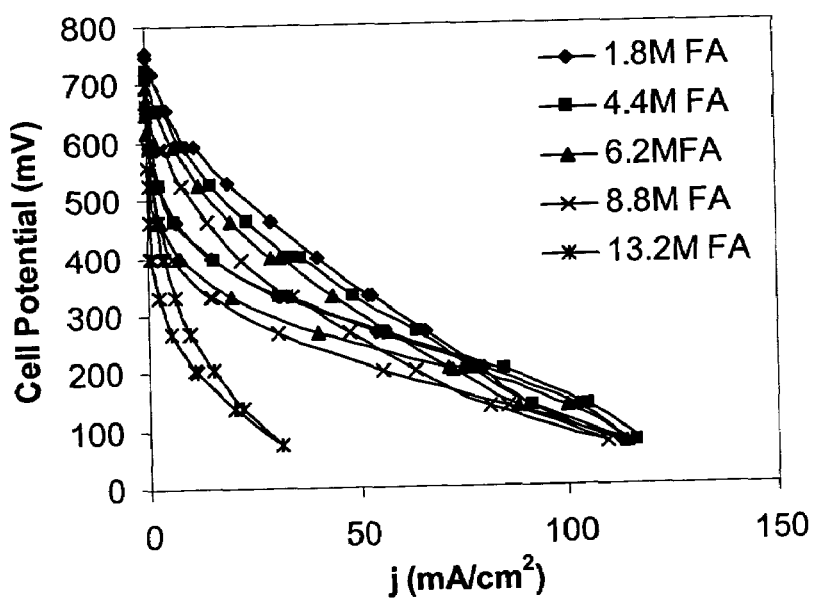
FIG. 5 VI Plot of Exemplary Fuel Cell

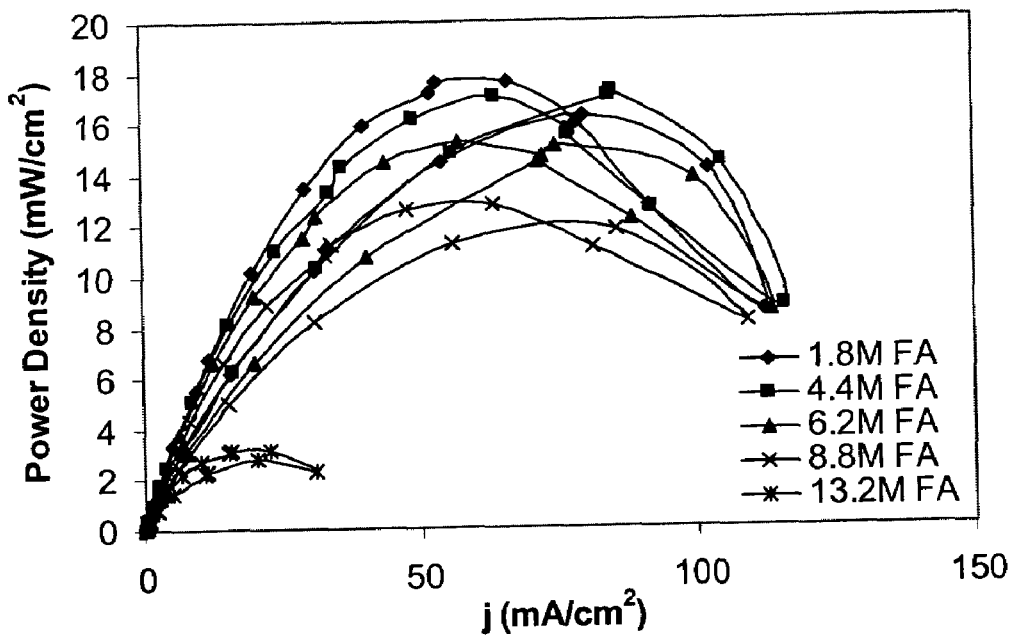
FIG. 6 Passive Formic Acid Fuel Cell Performance
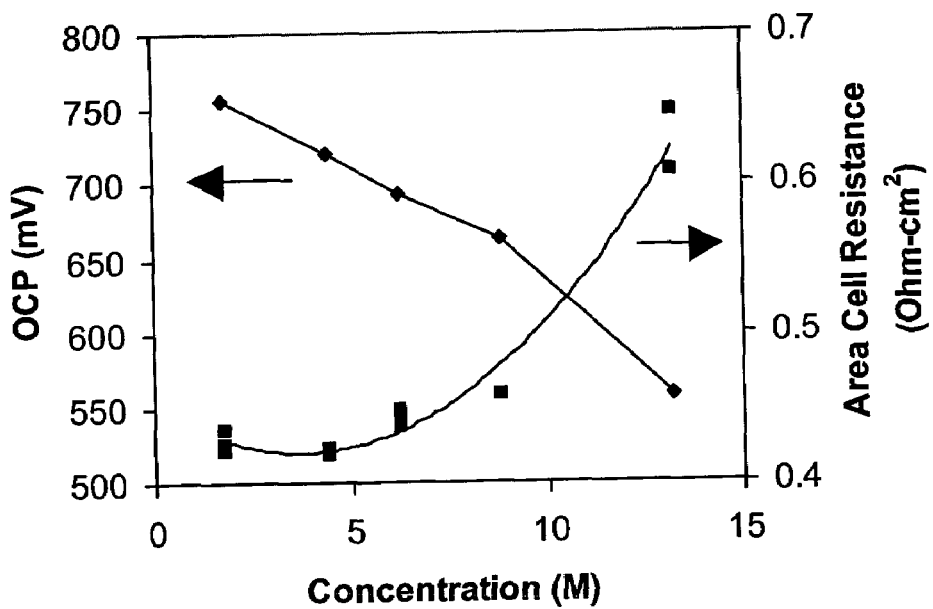
FIG. 7 Open Cell Potential of the Exemplary Fuel Cell

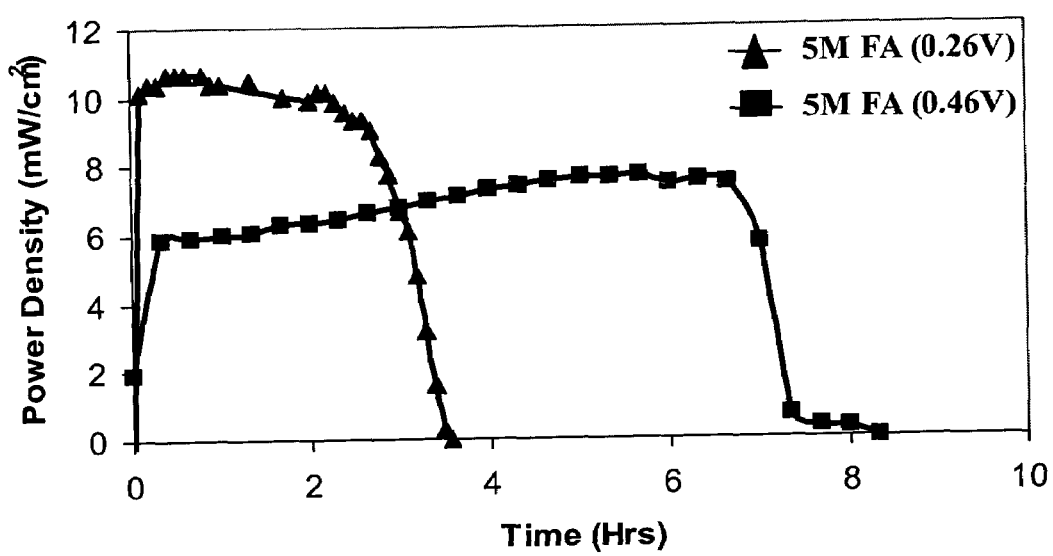
FIG. 8 Power Density vs. Time Performance

ORGANIC FUEL CELLS AND FUEL CELL CONDUCTING SHEETS

PRIORITY CLAIM

This application is a continuation in part of U.S. application Ser. No. 10/407,385 filed Apr. 4, 2003 now U.S. Pat. No. 7,132,188; which claims priority of U.S. Provisional Application Ser. No. 60/369,992, filed Apr. 4, 2002.

STATEMENT OF GOVERNMENT INTEREST

This invention was made with Government assistance under Defense Advanced Research Projects Agency under Air Force contract No. F33615-01-C-2172 and the Department Of Energy Grant No DEGF-02-99ER14993. The Government has certain rights in the invention.

FIELD OF THE INVENTION

The invention generally relates to organic fuel cells, with passive organic fuel cells using a formic acid fuel solution being an example, as well as organic fuel cell conducting sheets.

BACKGROUND OF THE INVENTION

Fuel cells are electrochemical cells in which a free energy change resulting from a fuel oxidation reaction is converted into electrical energy. Applications for fuel cells include battery replacement, mini and microelectronics, car engines, power plants, and many others. One advantage of fuel cells is that they are substantially pollution-free.

In hydrogen fuel cells, hydrogen gas is oxidized to form water, with a useful electrical current produced as a byproduct of the oxidation reaction. A solid polymer membrane electrolyte layer can be used to separate the hydrogen fuel from the oxygen. The anode and cathode are arranged on opposite faces of the membrane. Electron flow between the anode and cathode layers of the membrane electrode assembly can be exploited to provide electrical power. Hydrogen fuel cells are impractical for many applications, however, because of difficulties related to storing and handling hydrogen gas as well as other reasons.

Organic fuel cells can prove useful in many applications as an alternative to hydrogen fuel cells. In an organic fuel cell, an organic fuel such as methanol is oxidized to carbon dioxide at an anode, while air or oxygen is simultaneously reduced to water at a cathode. One advantage over hydrogen fuel cells is that organic/air fuel cells can be operated with a liquid organic fuel. This eliminates problems associated with hydrogen gas handling and storage. Some organic fuel cells, called "indirect", require initial conversion of the organic fuel to hydrogen gas by a reformer. The required reformer increases cell size, cost and complexity. Other types of organic fuel cells, called "direct," eliminate these disadvantages by directly oxidizing the organic fuel without conversion to hydrogen gas. To date direct organic fuel cell development has focused on the use of methanol and other alcohols as fuel.

Conventional direct methanol fuel cells have numerous unresolved problems associated with them. For example, methanol and other alcohols have high osmotic and diffusion crossover rates across polymer membrane electrode assemblies. Fuel that crosses over avoids reaction at the anode, cannot be exploited for electrical energy, and thereby limits cell efficiency. Crossover also leads to poisoning of the cathode as fuel crosses over the polymer membrane and blocks reaction sites when it adsorbs onto the cathode catalyst. Efficiency of the cell is thereby further reduced. A proposed solution to this problem has been to provide additional catalyst. The relatively high cost of catalyst particles makes this a costly alternative.

Because of high crossover, methanol and other alcohol fuel cells typically operate with a low fuel concentration of not more than 8%. These relatively low concentrations create additional problems. A supply of ultra-pure water in addition to a water management system that includes at least a sensor, a pump and a filter can be required. This adds cost and complexity, and substantially limits the usefulness of the cells for applications where size and weight become critical such as miniature and microelectronics applications.

Other problems also remain unresolved in the fuel cell arts. For example, so-called passive fuel cells differ from active cells in that passive cells generally have a fixed amount of fuel, whereas active cells have fuel fed to them. Because passive cells are often lower in weight, smaller in size, and otherwise simpler than active cells, they are often favored for mini and microelectronics applications. The efficiency of passive cells can be limited, however, by the circulation of fuel to the anode. If stored fuel cannot be effectively communicated to the anode, it cannot react. Circulation pumps have been proposed to circulate liquid fuel in a passive cell. Such pumps, however, render moot some of the advantages of the passive cell.

Many passive cells, with miniature passive cells being a particular example, require an elevated temperature to produce the level of power density required for many applications. This can be a problem, in that energy must be provided to elevate the temperature. Such cells have proven difficult to use in many near ambient temperature applications, such as battery replacement in miniature and microelectronics devices.

Still other problems in the art relate to methods for making fuel cells and fuel cell assemblies. For example, for miniature and microelectronics applications, fuel cell assemblies that are relatively large, bulky, and/or heavy pose problems. The use of fasteners such as bolts and the like to hold the portions of a cell together, for instance, tend to add size and weight to small scale fuel cells.

These and other problems remain unresolved in the art.

SUMMARY OF THE INVENTION

An embodiment of the present invention is directed to a passive direct organic fuel cell that includes an anode, an anode enclosure communicating with the anode and containing an organic fuel solution, a cathode communicating with an oxygen source and electrically connected to the anode, and an electrolyte separating the anode and the cathode. The anode, cathode and the electrolyte are operative to oxidize the organic fuel solution at the anode and reduce oxygen at the cathode to generate power having a density of at least 15 $mW/cm^2$ when operating at room temperature.

Another aspect of the invention is directed to a passive direct organic fuel cell that includes an anode, an anode enclosure communicating with the anode and containing an organic fuel solution that is at least 1.8 M formic acid, a cathode communicating with an oxygen source and electrically connected to said anode, and an electrolyte sandwiched between the anode and the cathode. The anode, cathode, and electrolyte are operative to generate power having a power density of at least 10 mW/cm² when operating at room temperature.

An additional embodiment of the present invention is directed to an organic fuel cell that includes an anode enclosure that is configured to promote circulation of a liquid organic fuel solution contained therein. Preferably, the anode enclosure includes a gas remover. Still another aspect of the present invention is directed to a method for making an organic fuel cell assembly. An exemplary method for making a fuel cell assembly includes the steps of: providing a membrane electrode assembly including a solid polymer electrolyte sandwiched between an anode and a cathode, hot pressing an anode current collector to the anode of the membrane electrode assembly to define a first perimeter surface, and hot pressing a cathode current collector to the cathode of said membrane electrode assembly to define a second perimeter surface. The method further includes the steps of sealing the first and second perimeter surfaces with at least one sealant. A preferred sealant is resistive to formic acid. An anode enclosure can also be attached to the assembly using an adhesive that is resistive to formic acid.

Still an additional aspect of the invention is directed to a method for modifying a fuel cell carbon cloth. The method generally includes chemically modifying the surface of the carbon cloth to cause the contact angle between water and the carbon cloth to be less than 120°. Also, a direct organic fuel cell of the invention may include a carbon cloth with a modified surface that causes the contact angle between the cloth and water to be less than 120°. In another aspect of the present invention, a passive organic fuel cell includes a replaceable fuel cartridge useful to load a liquid organic fuel solution into the fuel cell.

Valuable benefits and advantages are achieved through practice of embodiments of the present invention, as will be appreciated through consideration of the detailed description that follows.

BRIEF DESCRIPTION OF THE DRAWINGS

FIG. 2 is a data plot illustrating performance of an exemplary fuel cell of the invention using various concentrations of formic acid fuel solution;

FIG. 3 is a data plot illustrating the performance of an exemplary fuel cell of the invention using various catalysts and 1.8 M formic acid fuel solution;

FIG. 4 is a data plot illustrating the performance of an exemplary fuel cell of the invention using various catalyst loadings;

FIG. 5 is a data plot of the polarization curves of an exemplary fuel cell of the invention using various formic acid concentrations;

FIG. 6 is a data plot illustrating the results of FIG. 5 in terms of power density;

FIG. 7 is a data plot illustrating the effects of formic acid concentration on the open cell potential of an exemplary fuel cell of the invention;

FIG. 8 is a data plot illustrating the time-based results of constant cell voltage tests for an exemplary fuel cell of the invention;

DETAILED DESCRIPTION

The present invention is directed to fuel cells, such as passive direct organic fuel cells, to fuel cell assemblies, to methods for making fuel cells and fuel cell assemblies, and to fuel cell conducting sheets and methods for making conducting sheets. Various embodiments of the present invention are believed to be particularly beneficial when practiced with passive direct organic fuel cells containing a formic acid fuel, although other organic fuel solutions are also contemplated. Before discussing various exemplary embodiments of the present invention, it will be appreciated that description of one embodiment can relate to other embodiments as well. For instance, when describing a method for making a fuel cell, it will be appreciated that description can likewise be made of a fuel cell. Also, the present inventions are related to the inventions described in co-pending U.S. application Ser. No. 10/407,385 filed on Apr. 4, 2003 ("the '385 application"), which application is incorporated herein by reference.

It will also be appreciated that although numerical values will be presented herein to describe the invention in units such as temperature, molarity, concentration, length, weight, and the like, the present invention is not limited to the precise numerical values given. Those skilled in the art will appreciate that values reasonably close to those presented will likewise provide benefits and advantages of the invention. Accordingly, numerical limits included in the description and claims of the invention should not be interpreted as precise values that limit the invention.

One aspect of the present invention is directed to a passive direct organic fuel cell operative to oxidize an organic fuel solution to provide a useful electric current. Formic acid is a preferred organic fuel solution, although other organics such as methanol and other alcohols, formaldehyde and other aldehydes, ketones, di- and tri-methoxy methane and other oxygenates are also contemplated for practice of the invention. Preferred fuels include those that have low or no crossover across the polymer electrolyte membrane, as is discussed in detail in the '385 application.

Figure 1:
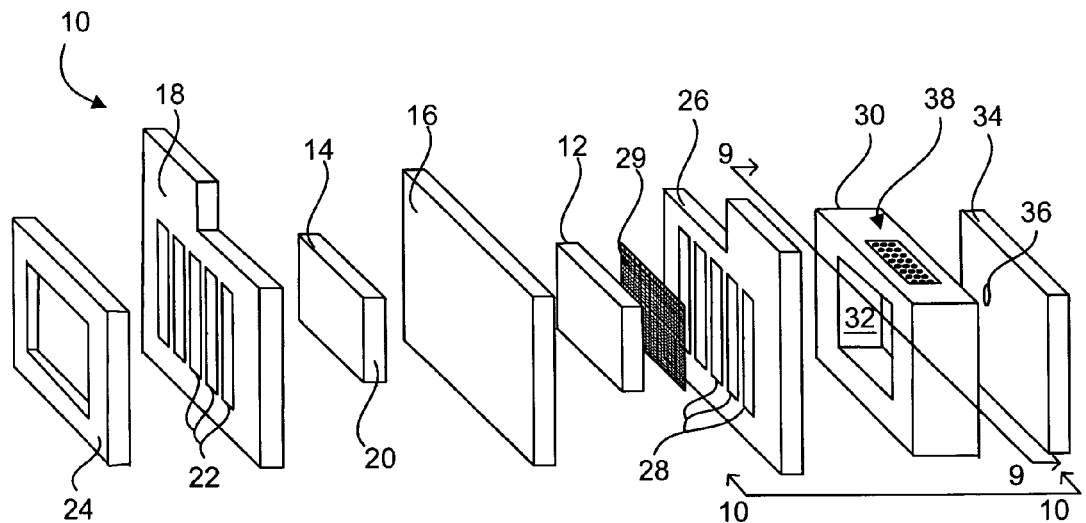
FIG. 1 is an exploded view of an exemplary fuel cell of the invention.

FIG. 1 is an exploded view of an exemplary fuel cell assembly 10 of the invention. It includes an anode 12 and a cathode 14, with a solid polymer electrolyte 16 sandwiched therebetween. A preferred solid polymer electrolyte membrane 16 is a copolymer of tetrafluoroethylene and perfluorovinylether sulfonic acid, with an example being the membrane 16 available under the NAFION trade name from DuPont Chemical Co., Delaware. Other membrane materials can also be used, with examples including membranes of modified perfluorinated sulfonic acid polymer, polyhydrocarbon sulfonic acid, membranes containing other acidic ligands and composites of two or more kinds of proton exchange membranes.

The anode 12, cathode 14 and solid polymer electrolyte 16 can comprise a unitary membrane electrode assembly (MEA). For example, an MEA can be formed when the anode 12 and cathode 14 are painted or otherwise deposited as a liquid "ink" or slurry form onto opposite surfaces of the membrane 16. Each of the anode 12 and the cathode 14 can include a catalyst layer with an example being fine Pt particles either supported or unsupported and directly applied to opposite sides of the NAFION membrane. When the catalyst ink dries, solid catalyst particles adhere to the membrane 16 to form the anode 12 and the cathode 14.

A cathode current collector 18 covers a surface 20 of the cathode 14. A plurality of slots 22 through a portion of the cathode current collector 18 provides access to the cathode 20. An insulator 24 covers a portion of the cathode current collector 18. In operation, the cathode 14 of the exemplary cell remains open to the atmosphere, although other cell configurations are contemplated in which oxygen can be supplied through other means. An anode current collector 26 covers a surface of the anode 12. Like the cathode current collector 18, the anode current collector 26 has a plurality of slots 28 that provide access to the anode 12 and increase the operative surface area.

A conducting sheet 29 can be sandwiched between the current collector 26 and the anode 12 to facilitate distribution of charge. Although not illustrated, a conducting sheet 29 can also be provided between the cathode current collector 18 and the cathode 14. The conducting sheet 29 can be gold mesh, carbon cloth, or the like. The conducting sheet 29 can also provide some mass transfer functionality to facilitate transfer of fuel to the anode 12. For example, a carbon cloth that has been modified to change its surface interactions with water is believed to offer useful benefits and advantages for operation of some cells of the invention. The anode 12 and the anode current collector 26 are attached to an anode enclosure 30 that includes a cover plate 34 and defines a chamber 32. When the fuel cell 10 is assembled, the chamber 32 is operative to contain an organic fuel solution. A fill passage 36 allows for communicating fluids to and from the chamber 32. The fill passage 36 can be sealed to provide a self-contained fuel cell that can be useful, for instance, as a miniature power source for small or microelectronics devices and like applications.

When an electrical load (not shown) is electrically connected between the anode current collector 26 and the cathode current collector 18, electro-oxidation of an organic fuel occurs at the anode 12 and electro-reduction of an oxidizer occurs at the cathode 20. The occurrence of different reactions at the anode 12 and cathode 20 gives rise to a voltage difference between the two electrodes. Electrons generated by electro-oxidation at the anode 12 are conducted through the anode current collector 26, through the electrical linkage to the electrical load, to the cathode current collector 18, and are ultimately captured at the cathode 20. Hydrogen ions or protons generated at the anode 12 are transported across the membrane electrolyte 16 to the cathode 20. A flow of current is thereby sustained by a flow of ions through the membrane electrolyte 16 and electrons through the electrical linkage (not shown) between the cathode collector 18 and the anode collector 26 that results in an electrical current that can be utilized to power an electrical device, for instance.

Passive direct formic acid fuel cells of the present invention provide many advantages and benefits. For example, fuel cells of the invention can provide compact and self-contained power sources that are useful for a wide variety of applications where batteries have traditionally been used. No pumps or water management systems are required, and oxygen can be supplied from air.

In order to further illustrate various aspects of the present invention, description of an exemplary fuel cell and its performance will be made. An exemplary passive fuel cell was constructed generally consistent with the fuel cell illustrated in FIG. 1. For convenience, element numbers from that FIG. will be used where appropriate to describe the exemplary cell.

An anode catalyst paint was prepared by mixing 12 mg of Johnson Mathey Hispec 6000 PtRuBl, 10% (wt) of NAFION solution (NAFION is a trade name of a fluorocarbon polymer material available from Solution Technology Inc.), and 120 mg Millipore water. This mixture was then sonicated for 10 minutes in an ice slurry bath. A cathode catalyst paint was prepared by mixing 12 mg of Johnson Mathey Hispec 1000 platinum black, 10% (wt) of the NAFION solution and 120 mg Millipore water. This mixture was then sonicated for 10 minutes in an ice slurry bath. It is noted that many different anode and cathode catalysts are contemplated for practice with the present invention. Exemplary anode catalysts are discussed in the '385 application.

It has also been discovered that using a NAFION binder concentration of below 25% in the anode catalyst provides valuable advantages and benefits for fuel cell performance. In addition to acting as a binder for the catalyst materials, the NAFION or other copolymer of tetrafluoroethylene and perfluorovinylether sulfonic acid also enhances proton conductivity of the catalyst layer. These benefits must be balanced with the disadvantageous blocking of fuel delivery that the NAFION binder causes. Using a NAFION or other copolymer of tetrafluoroethylene and perfluorovinylether sulfonic acid based binder concentration of less than 25% (wt), and preferably greater than 5% (wt), has been discovered to result in optimal performance of the catalyst layer. As an alternative, it has also been discovered that use of a polytetrafluorethylene (PTFE) binder, with TEFLON (trade name of Dupont Chemical, Delaware) being a widely available commercial example, can also provide benefits over the NAFION binder. It is believed that PTFE based binders do not block the organic fuel delivery to the extent that NAFION does.

The exemplary catalyst materials were painted onto opposite surfaces of a polymer electrolyte membrane 16 to form the anode 12 and cathode 14. A NAFION 117 membrane from Solution Technology Inc. was used. The membrane was conditioned in the following sequence: 1) placed in a 5% hydrogen peroxide solution for one hour; 2) boiled in Millipore water for one hour; 3) place in a 5% of sulfuric acid for one hour; and 4) boiled in a Millipore water for one hour.

A 3.5 cm×3.5 cm size portion of the conditioned NAFION membrane 16 was placed on a vacuum table under a heating lamp. The temperature of the vacuum table was fixed between 70° and 80° C. Several different anodes 12 were investigated. A 1 cm$^2$ active area anode 12 was fabricated by painting anode catalyst of either platinum black or platinum ruthenium black (HiSPEC™ 6000 from Johnson Matthey) at a loading of 4-12 mg/cm$^2$ onto the NAFION membrane 16. The final anode 12 contained 10% (wt) NAFION, and was dried for 10 minutes on the vacuum table. The membrane 16 was then flipped on the vacuum table and a 1 cm×1 cm area painted on to the opposite surface using 12 mg/cm$^2$ of Johnson Mathey Hispec 1000 catalyst to form the cathode 14. The resulting membrane 16 with its painted on anode 12 and cathode 14 form an MEA.

An air breathing miniature sized formic acid fuel cell was then constructed generally as in FIG. 1. Both the anode and cathode current collectors 26 and 18, respectively, were tantalium foils electrochemically coated with a 5 micron thick layer of gold. It has been discovered that a coating such as gold that is resistive to formic acid is beneficial for cell performance. Preferably it is provided in a thickness of at least 0.1 nm, and more preferably between 1 and 5 microns. A TEFLON anode enclosure 30 includes the chamber 32, and the TEFLON cover plate 34 closes the chamber so that it can contain a formic acid fuel solution. The chamber 32 has dimensions of 1 cm (width)×1.4 cm (height)×0.56 cm (depth). Through the top wall of the enclosure 30, one hundred 0.010" passages 40 were drilled to define a gas remover 38, which will be discussed in detail herein below. A TEFLON cathode insulator 24 was provided, and the assembly clamped together using stainless steel holders and bolts (not shown).

The first exemplary fuel cell was tested using formic acid solutions of varying concentrations and cell performance measured using a fuel cell station from the Fuel Cell Technology Inc. Double distilled 88% formic acid (GFS) was diluted with Millipore water to prepare formic acid fuel solutions of desired concentration. The formic acid fuel solution was injected into the chamber 32 through the port 36 using a syringe. The cathode 14 was opened to air for supply of oxygen. No conducting sheet 29 was used with the cathode 12 for this series of tests.

FIG. 2 shows the results of tests using different concentrations of formic acid fuel solutions with an anode 12 loading of 12 mg of Johnson Mathey Hispec 6000 catalyst. The data of FIG. 2 result from running the exemplary cell at a fixed cell potential at room temperature until the cell ran out of fuel, with 0.6 cc of fuel solution initially loaded. Tests were run at room temperature. For these tests, no carbon cloth was used on the anode or cathode. The voltage of the exemplary passive cell was set constant at 0.26 V.

At 2 M formic acid the power density increased initially as the operation time increased. However, when it reached the maximum power density after a short while, its power density output dropped. After 2 hours of operation, its power output at 0.26 V went down to zero when all of the fuel was used. Between the fuel concentration of 5 and 8.8 M, the power densities initially increased until they reached the steady state. The results illustrated by FIG. 2 suggest that the operation time of fuel cells of the invention is proportional to the fuel concentration. As the fuel concentration increased, the cell operational time at 0.26V increased. At the fuel concentration of 8.8 M, the miniature fuel cell generated between 10 to 11 mW/cm$^2$ of power density up to 4 hours.

FIG. 3 shows the exemplary fuel cell performance using 1.8 M formic acid fuel solution and either a platinum black or a platinum ruthenium (PtRu) anode catalyst at room temperature. As used herein, "room temperature" is intended to refer to temperatures of 17-25° C. In either case an open cell potential of nearly 800 mV is observed. The potential goes down as current is drawn from the cell. At low cell potential, PtBl catalyst gave a little more current density than the PtRuBl anode catalyst while the opposite is true at the high current densities. FIG. 4 illustrates the effect of different anode catalyst loadings on performance at room temperature.

FIG. 5 shows the effect of the different formic acid concentration on the exemplary cell polarization curve profile over a concentration range between 1.8 to 13.2 M formic acid at room temperature. For these tests, no conducting sheet was used on the anode or cathode. Above a cell potential of 200 mV, the current densities slightly decreased as the formic acid concentration increased from 1.8 to 8.8 M. Below 200 mV, the current densities were very similar. FIG. 5 shows 113 mA/cm$^2$ as the maximum current density at room temperature. At 13.2 M formic acid, the current density decreased sharply over the entire cell potential range.

In FIG. 6, the results from FIG. 5 have been plotted in terms of power density for the different formic acid concentration. Because the plots twist, the maximum power density occurs at two different current density points: it is measured at 16.6 mW/cm$^2$ at the formic acid concentration of 1.8 and 4.4 M. The high operational concentration range for the passive air breathing formic acid fuel cells of the invention offer many advantages and benefits.

FIG. 7 shows the effects of the different formic acid concentrations on the apparent open cell potential (OCP) of the exemplary passive fuel cell. Tests were performed at room temperature. At formic acid concentration of 1.8 M, a maximum OCP of 0.76 V was observed. As the formic acid concentration increased from 1.8 to 13.2 M, the OCP of the cell decreased. FIG. 7 also shows the high frequency cell resistance. The cell resistance was not influenced much by the formic acid concentration change from 1.8 to 8.8 M, while the OCP of the cell decreased by 93 mV for the same concentration change. As the formic acid concentration increased from 8.8 to 13.2 M, the cell resistance increased significantly while the OCP of the cell dropped.

FIG. 8 illustrates the exemplary fuel cell's performance with respect to time under certain conditions. Two tests were performed, each at room temperature and each using 0.7 cc of 5 M formic acid fuel solution. The constant cell voltage tests were conducted at 0.26 and 0.46 V. For this test, no conducting sheet was used on the anode or cathode. The power density output at 0.46 V was 6 mW/M$^2$ for 7 hrs, and was 10 mW/M$^2$ at 0.26 V for 3 hrs.

In an additional series of tests with the exemplary fuel cell, the performance of the cell was investigated using different conducting sheets 29 (FIG. 1). In a first experiment a conducting sheet 29 of a 1 cm×1 cm pieces of ALPHA AESAR #40931 gold mesh on both sides of the MEA (between the cathode and anode current collectors 18 and 26 and the respective anodes and cathodes 12 and 14). The gold foil conducting sheet substantially increased the maximum power to 33 mW/cm$^2$ and the maximum current to 250 mA/cm$^2$.

In an additional series of tests the effects of different carbon cloth conducting sheets 29 were investigated. Carbon cloth conducting sheets 29 are believed to be of potential utility for purposes of mass transfer in addition to conducting electric charge. A first test was run without any carbon cloth, a second using ETEK type A plain carbon cloth (plain carbon cloth), a third using a ETEK ELAT V2 carbon cloth with a single side Teflon layer (Teflon carbon cloth), and a fourth using oxygen plasma treated carbon cloth (modified carbon cloth). The exemplary cell with the "no carbon cloth" and with the "modified carbon cloth" generated the most current density over the entire cell potential range. The miniature cell with the plain carbon cloth and the Teflon carbon cloth generated a lower current density than that cell with the modified carbon cloth or no carbon cloth. It is believed that any increase in collection of current and transfer of formic acid to the anode that these two types of carbon cloth offer are outweighed by the tendency of $CO_2$ gas to adhere to the cloth and block the anode.

The cell running with modified carbon cloth and with no carbon cloth generated consistent current densities at low potentials, but the modified carbon cloth provided the highest current densities at high concentrations. Modified carbon cloth therefore appears to offer valuable advantages associated with running at high fuel concentrations. It is believed that when properly modified, the carbon cloth achieves a balance between two competing mechanisms: effective transfer of organic fuel such as formic acid to the anode, and resistance of transfer of water from the membrane. If the carbon cloth is modified to be too hydrophilic, dehydration of the membrane can cause the cell to shut down. If the carbon cloth is not hydrophilic enough, on the other hand, transfer of formic acid to the anode is not substantial. The preferred modified carbon cloth of the invention has been modified to allow for a formic acid fuel cell using a fluorocarbon based solid polymer electrolyte to operate at formic acid fuel concentrations of 13 M or more.

An additional aspect of the invention is directed a modified carbon cloth having an advantageous balance of hydrophobic/hydrophilic tendencies, as well as to a method for modifying the carbon cloth. The method includes a step of modifying the surface of the carbon conductor sheet to make it hydrophilic. Specifically, the surface is modified to add hydrophilic ligands such as one or more of CO, OH and/or COOH groups. Methods for modifying the carbon cloth can include boiling in an acid solution, adding a functionalizing agent, or exposing to an oxygen plasma.

To further illustrate this aspect of the present invention, advantageous modification of ETEK Plain Type A carbon cloth was accomplished through exposure to oxygen plasma. The carbon cloth was loaded into a Uniaxis 790 Series Reactive Ion Etcher, and the etching chamber pumped down to a pressure of 20 mTorr. The carbon cloth was then subjected to oxygen plasma formed by an oxygen gas flow of 10 sccm and a RF power bias of 100 W. The samples were subjected to the plasma for 3 minutes. The chamber was then purged with pure nitrogen for 3 minutes. The chamber was vented and then the samples were removed and tested for increased hydrophilic behavior by dropping small drop of distilled water on each side. The water was immediately absorbed by the carbon cloth, which indicated that sufficient modification of the cloth had occurred. In contrast, the water beads up on the plain carbon cloth and the Teflon coated carbon cloth.

In order to further describe this aspect of the present invention, measurements were made of the contact angle between carbon cloth samples that were modified through a method of the invention and un-modified carbon cloth samples. The water drop had a contact angle of 135° with plain carbon cloth (ETEK Plain Type A Carbon Cloth) and 155° on the Teflon coated sided carbon cloth (ETEK ELAT V2 single sided Carbon Cloth). In contrast, the carbon cloth modified through the method of the invention showed a contact angle of near zero. It is believed that modifications that result in contact angles of less than 120°, and more preferably near zero, provide useful benefits and advantages.

Another aspect of the present invention is directed to direct organic fuel cells that include an anode chamber configured to promote circulation of liquid fuel contained therein through movement of gas through the solution. Referring again by way of example to FIG. 1, when an organic fuel is oxidized on the anode 12, reaction products can include gases such as $CO_2$ and/or CO. Theses gases form bubbles on the surface of the anode 12. It has been discovered that the anode chamber 32 can be configured to exploit this gas to provide circulation of the fuel solution held in the chamber 32. For example, it has been discovered that an anode chamber 32 that includes the gas remover shown generally at 38 is useful to cause the gas to flow through the fuel solution held in the chamber 32 sufficiently to provide useful circulation of the solution.

Figure 9:
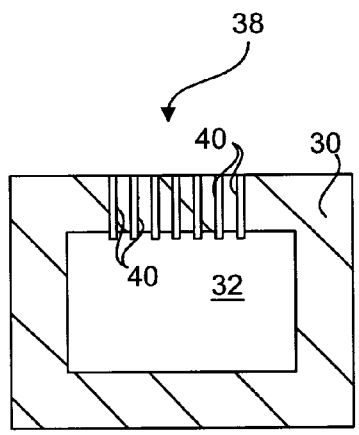
FIG. 9 is a cross section of a portion of the exemplary fuel cell of FIG. 1 viewed generally along the line 9-9 of that FIG. in the direction indicated.
Figure 10:
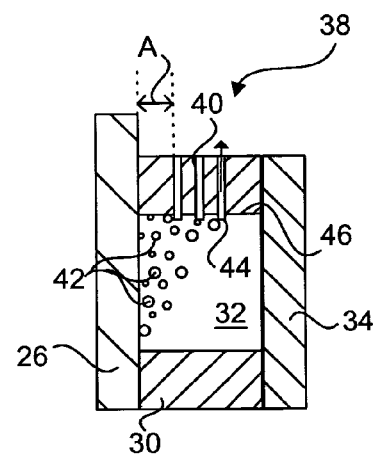
FIG. 10 is a cross section of a portion of the exemplary fuel cell of FIG. 1 viewed generally along the line 10-10 of that FIG. in the direction indicated.

As best shown by the cross sections of indicated portions of the fuel cell of FIG. 1 that are shown in FIGS. 9 and 10, the gas remover 38 includes a plurality of passages 40 that communicate between the chamber 32 and the atmosphere external to the chamber 32. The cross section of FIG. 10 illustrates a portion of the fuel cell 10 in an assembled form. Gas bubbles 42 formed on the anode 12 (FIG. 1) will travel through the fuel solution held in the chamber 32 to the passages 40, through which they can then exit the chamber 32 in the direction of the arrow. As gas bubbles 42 are formed, the pressure in the chamber 32 increases and creates a pressure differential across the passages 40. The driving force of the pressure differential directs the gas bubbles 42 out of the chamber 32.

The passages 40 are configured to substantially prevent passage of the fuel solution while allowing gas to pass therethrough. It has been discovered that providing passages 40 in a generally tubular shape and with a length to diameter ratio of at least 0.5 is beneficial to prevent liquid flow, as is use of a hydrophobic surface on the interior surface of the passages 40. Preferably, the passages 40 have a diameter of no more than 1/32", and more preferably no more than 0.01", and a length of at least 0.125 in. At least about five passages 40 are preferably provided, and more preferably they are provided in a ratio of about twenty passages 40 of no more than 1/32" diameter per $cm^2$ of useful anode area. An exemplary hydrophobic construction material for the passages 40 includes the fluorocarbon-based polymer commercially available from 3M Corporation, Minneapolis Minn. under their registered trademark KEL-F. It is contemplated that the passages 40 can be provided in more than one wall of the anode enclosure 30.

In order to promote circulation of the fuel solution, the gas remover 38 is preferably configured to cause the gas bubbles 42 to travel some minimum distance through the chamber 32. For example, the passages 40 are preferably placed a distance A of at least 0.1 inches from the anode current collector 26. Also, it has been discovered that providing a passage entrance 44 that is separated by a distance from the wall 46 of the anode enclosure 30 is also useful to promote useful circulation of the fuel solution. A distance of at least 0.01 in. is preferred.

Through the gas remover 38 of the invention, substantial savings in cost, size, weight, and complexity of the fuel cell can be achieved, as well as increases in cell efficiency. Although the fuel cell 10 of the invention will prove beneficial when used with a wide variety of organic fuel solutions, it has shown particularly beneficial results when used with formic acid fuel solutions. In particular, when used with formic acid fuel solutions having a formic acid concentration of at least 1.8 M circulation of the fuel solution results to an extent that no external circulation pump or other mechanical circulation device is required. Higher fuel concentrations are generally favored due to increased $CO_2$ production. Formic acid is beneficial because a fluorocarbon solid polymer electrolyte is substantially impervious to its crossover, production of toxic CO can be avoided when it is oxidized, as well as for additional reasons. Also, it will be appreciated that gas removers of the invention will be of particular utility in passive fuel cells in which no circulation is provided by mechanical means.

Figure 11:
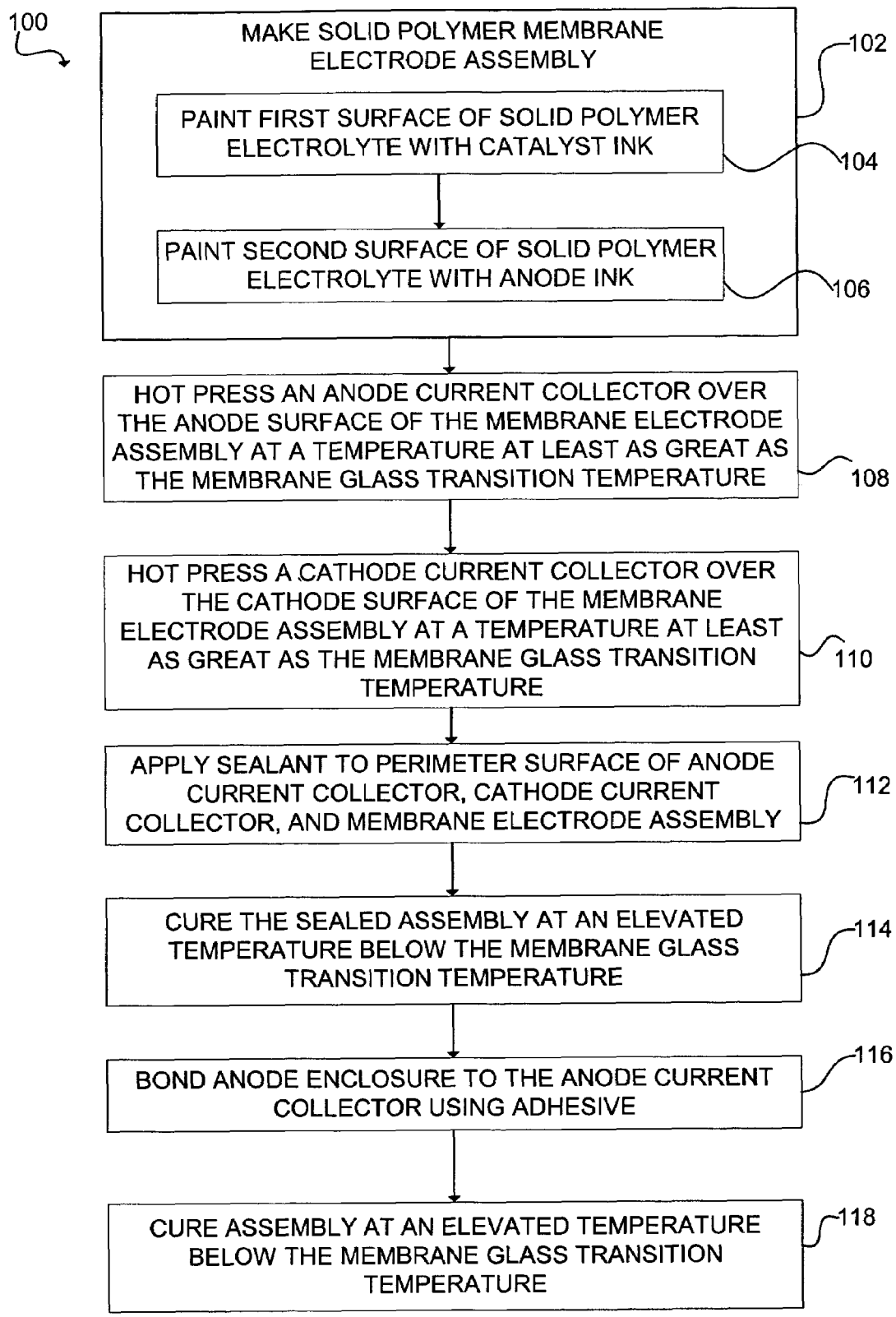
FIG. 11 is a flowchart illustrating the steps of one exemplary method for making a fuel cell assembly of the invention.

Another aspect of the present invention is directed to methods for making fuel cells and fuel cell assemblies. FIG. 11 is a flowchart illustrating one exemplary method 100 of the present invention. A membrane electrode assembly is prepared (block 102) by painting a cathode catalyst ink on one surface of a solid polymer electrolyte (block 104) and by painting an anode catalyst ink on an opposite second surface of the solid polymer electrolyte (block 106). The painting can be done over the entire surface, but more preferably is done over only a portion of the surface that will be exposed to reactants.

Following preparation of the membrane electrode assembly, cathode and anode collectors are hot pressed onto the assembly (blocks 108, 110). The current collectors are hot pressed at an elevated temperature that is preferably at least as great as the glass transition temperature of the solid polymer electrolyte. When using a preferred fluorocarbon electrolyte membrane such as that commercially available under the NAFION trademark from DuPont Chemicals, Delaware, hot pressing is carried out at a temperature that is preferably at least 135° C. Temperatures of this magnitude cause bonding to occur between the current collectors and the membrane due to the melting of some of the membrane. Hot pressing can be carried out for a period of time required to achieve a good attachment, with an exemplary period being a few minutes.

The resulting membrane electrode assembly and hot pressed current collectors are then sealed about their perimeters with a bonding material. This step can be best described through consideration of FIG. 13 that shows a solid polymer electrolyte membrane 202 with an anode shown in phantom as element 204 having been painted onto a portion of one surface, and a cathode shown in phantom as element 206 having been painted onto a portion of the opposite surface. A cathode current collector 208 has been hot pressed over the cathode 206, and an anode current collector 210 hot pressed over the anode 204. In this configuration, a perimeter surface 212 is defined about the perimeter of the assembly. Put another way, the perimeter surface 212 is defined by the four sides of the assembled components that are not facing one another.

Figure 12:
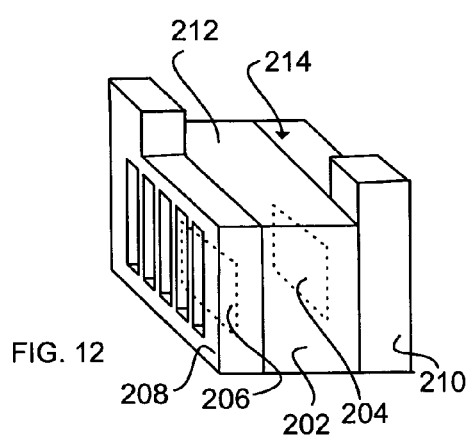
FIG. 12 is schematic illustration, partly in phantom, of a fuel cell assembly of the invention useful to illustrate the steps of the method of FIG. 11.

Referring now to the flowchart of FIG. 11 in addition to the schematic of FIG. 12, the method 100 further includes a step of applying a sealant to at least a portion of the surface 212 (block 112). The portion covered preferably includes at least the region 214 proximate the interface between the surface of the polymer electrolyte membrane with the anode 204 and the anode current collector 210. Because this interface is near the anode surface 204, it has the potential of leaking fuel solution. Following application of the sealant, the assembly is cured at an elevated temperature that is below the glass transition temperature of the polymer electrolyte (block 114). An exemplary step of curing includes a temperature of 75° C. for a time period of 24 hrs.

A number of sealants are practical for use with the present invention. Because formic acid fuel solutions are contemplated for use in fuel cells made through steps of the invention, sealants that are resistive to formic acid are of particular interest in practice of the invention. Several sealants were investigated for their suitability for use with formic acid fuel solutions with concentrations in the range that are believed to be useful with the present invention. Of these, silicon and epoxy sealants were found to be particularly useful. For example, silicon sealant available under the trade name RTV and RTV Clear Silicon Sealant from the General Electric Co. and epoxy available under the trade name Thermally conductive Epoxy Resin 50-3185 with catalyst 105 from Epoxies Etc (Cranston, RI) did not fail through extended use, and expanded during wetting to increase sealing behavior.

In a subsequent step of the method 100, an anode enclosure is attached to the anode current collector using an adhesive (block 116). It will be appreciated that the adhesive acts as a sealant in this step. It will also be appreciated that many sealants have adhesive functionality. Accordingly, as used herein the terms "adhesive" and "sealant" will be understood to overlap-some "sealants" may function as adhesives and some "adhesives" may function as sealants. An adhesive resistant to formic acid, such as a silicon or epoxy sealant, is preferred for this step. After attaching, the assembly is once again cured at an elevated temperature that is below the glass transition temperature of the polymer membrane (block 118). An exemplary curing step includes exposure to a temperature of 75° for a period of 24 hrs. Potentially, the curing steps of blocks 118 and 114 could be combined for cost and time savings. Also, it can prove useful to treat the bonding surface of the anode enclosure before attaching to the current collector. Treatment can include, for instance, etching with a chemical agent to increase surface roughness.

An additional aspect of the invention may include a fuel cell such as the cell 10 shown in FIG. 1 that has one or more of its various components including the anode enclosure 30, cathode enclosure 24, electrolyte 16, and end plate 34 all held together using a sealant such as a silicone or an epoxy. The sealant is provided on interfacing of the various component surfaces to serve the dual purposes of sealing the cell from leakage in addition to being an adhesive that holds it together. Preferably, the sealant is a polymer that is resistive to formic acid, with preferred examples including the silicones and epoxies described herein above. A fuel cell assembled using adhesives may provide cost and other advantages over those of the prior art.

Figure 13:
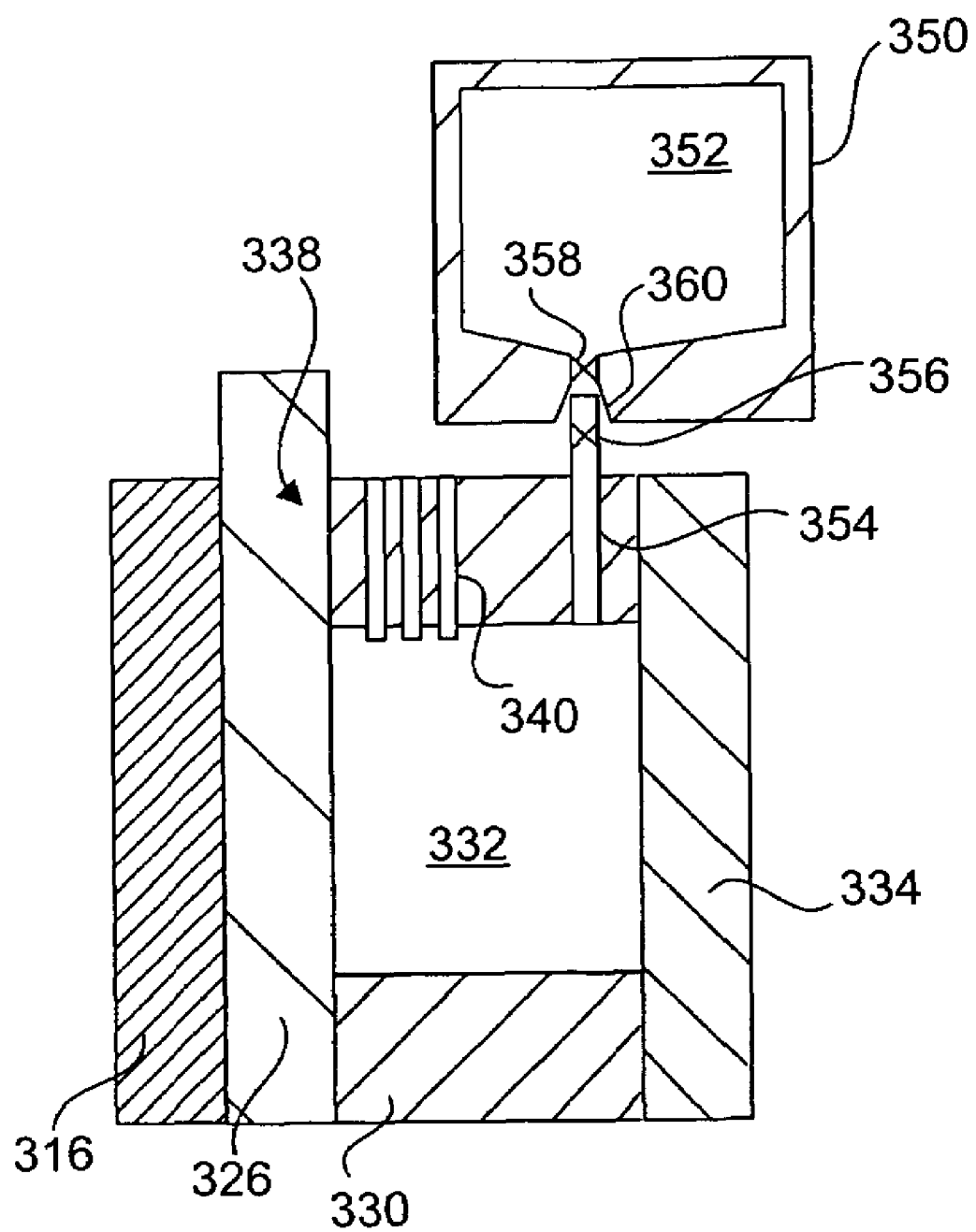
FIG. 13 is a schematic cross section of a portion of an exemplary fuel cell of the invention that includes a replaceable fuel cartridge.

FIG. 13 illustrates a portion of an exemplary fuel cell of the invention that includes still an additional aspect of the invention. The portion of the fuel cell shown in FIG. 13 is generally consistent with portions of the fuel cell 10 shown in FIGS. 1 and 9-10. Similar element numbers have been used to describe consistent elements between these FIGS., except that element numbers in the 300 series have been used in FIG. 13 for clarity. An anode chamber 332 is generally defined by an anode enclosure 330 and its cover plate 334. An anode current collector 326 and a solid polymer electrolyte membrane 316 communicate with the chamber 332. Although not illustrated, a cathode, a cathode current collector, and other elements may be present on the opposite side of the membrane 316 from the anode current collector 326. A gas remover shown generally at 338 includes a plurality of passages 340 for removing gas from the chamber 332.

The exemplary fuel cell embodiment of FIG. 13 includes a replaceable fuel cartridge 350. The replaceable cartridge 350 includes a fuel reservoir 352 for holding a supply of liquid organic fuel, such as a formic acid fuel solution. The replaceable cartridge 350 may be constructed of any suitable material, with an example being a PTFE such as TEFLON. The anode enclosure 330 is provided with a loading passage communicating with the chamber 332, with the loading tube 354 of FIG. 13 being an exemplary loading passage. The loading tube 354 is configured to mate with the replaceable cartridge 350. Preferably the loading tube 354 includes a sealing means such as a check valve 356. The check valve 356 is configured to provide one-way flow whereby flow is allowed into the chamber 332 from the cartridge reservoir 352 but reverse flow out of the chamber 332 is prevented.

Other sealing means and configurations are also contemplated.

The replaceable cartridge 350 includes a recessed valve 358 that is located at the terminal end of a loading port 360. An exemplary loading port 360 comprises a generally tapered cavity configured to receive the loading tube 354 and guide it into engagement with the recessed valve 358. The valve 358 may comprise a spring loaded or like configured valve that opens when the filling tube 354 engages it. Configurations like the exemplary recessed valve 358 and loading port 360 may be desirable to reduce the chances of exposure of a fuel solution to user contact during loading.

The replaceable cartridge 350 is useful to load fuel solution into the chamber 332 after depletion of existing fuel. It will be appreciate that the fill tube 354 may extend for any practical distance, so that a passive fuel cell of the invention may be within the body of an electronic device and yet remain accessible for re-fueling.

It will be appreciated that various embodiments of the invention, including passive direct organic fuel cells, show great promise for use in power applications. Many advantages are offered over direct methanol fuel cells and other organic fuel cells of the prior art. These advantages can be of particular utility in mini- or micro-electronic device applications. A few exemplary applications for use of formic acid fuel cells of the invention include replacements for portable batteries, power supplies for portable and microelectronic devices such as sensors, radios, cell phones, other communication devices, control devices, and the like. It will be appreciated that because of the relatively low potential of a single formic acid fuel cell, these and other applications can include a plurality of fuel cells of the invention such as the fuel cell 10 in series.

It is intended that the specific embodiments and configurations herein disclosed are illustrative of the preferred and best modes for practicing the invention, and should not be interpreted as limitations on the scope of the invention as defined by the appended claims.

What is claimed is:

1. A passive direct organic fuel cell comprising:
   an anode;
   an anode enclosure communicating with said anode and containing an organic fuel solution that is at least 1.8 M formic acid, said anode enclosure having a gas remover comprising a plurality of passages that are configured to allow passage of $CO_2$ from said enclosure while substantially preventing passage of said organic fuel solution, said plurality of passages positioned to promote circulation of said organic fuel solution as gas travels therethrough, said anode enclosure being configured to substantially prevent passage of said fuel solution therefrom during operation of the fuel cell whereby said fuel cell operates as a passive fuel cell;
   a cathode communicating with an oxygen source;
   a solid polymer electrolyte sandwiched between said anode and said cathode that is substantially impervious to said organic fuel solution; and,
   wherein said anode, said cathode, and said electrolyte are operative to generate power having a power density of at least 10 mW/cm² when operating at room temperature.

2. A passive direct organic fuel cell as defined by claim 1 wherein said fuel solution is at least 4.4 M formic acid and said power density is at least 14 mW/cm².

3. A passive direct organic fuel cell as defined by claim 1 wherein said fuel solution is at least 8.8 M, and wherein said anode, said cathode, and said electrolyte are operative to generate a power density of at least 10 mW/cm² at a constant voltage of 0.26 V when operating at room temperature for a period of at least 3 hours with no more than 0.6 cc of said fuel solution.

4. A passive direct organic fuel cell as defined by claim 1 wherein said anode enclosure, said anode and said electrolyte are held together by a polymer sealant that is resistive to formic acid.

5. A passive direct organic fuel cell as defined by claim 1 wherein said anode enclosure includes a sealable fill passage for connection to a replaceable fuel cartridge.

6. A passive direct organic fuel cell as defined by claim 1 and further including a replaceable fuel cartridge made of a PTFE and containing a liquid organic fuel solution, said replaceable fuel cartridge having a recessed valve.

7. A passive direct organic fuel cell as defined by claim 1 wherein said plurality of passages comprise at least 5 passages.

8. A passive direct organic fuel cell as defined by claim 1 wherein said anode enclosure includes a plurality of walls, and wherein each of said plurality of passages have an entrance extending inward into said anode enclosure that is separated from said at least one anode enclosure wall.

9. A passive direct organic fuel cell as defined by claim 8 wherein said entrance is separated from said wall by a distance of at least about 0.01 inch.

10. A passive direct organic fuel cell as defined by claim 1 wherein said plurality of passages have a length to diameter ratio of at least about 0.5 and have a hydrophobic interior surface.

11. A passive direct organic fuel cell as defined by claim 1 wherein said plurality of passages are provided in a ratio of about 20 passages per cm² of useful anode surface area.

12. A passive direct organic fuel cell as defined by claim 11 wherein each of said plurality of passages has a diameter of no more than about 1/32".

13. A passive direct organic fuel cell as defined by claim 1 wherein said anode enclosure is defined by a plurality of walls, and wherein at least a first of said plurality of passages is in a first of said plurality of walls and at least a second of said plurality of passages is in a second of said plurality of walls.

14. A passive direct organic fuel cell as defined by claim 1 wherein said anode enclosure further includes a sealing means operable to prevent said fuel solution from exiting said anode enclosure during operation of the passive fuel cell.

15. A passive direct organic fuel cell as defined by claim 14 wherein said sealing means comprises a valve.

16. A passive direct organic fuel cell as defined by claim 1 wherein said anode enclosure is sealed during operation of the passive fuel cell whereby said fuel solution is not exposed to any external pumping during operation of the cell.

17. A passive direct organic fuel cell as defined by claim 1 wherein said anode enclosure further includes one and only one passage for communicating said fuel solution into and out of said anode enclosure.

18. A passive direct organic fuel cell comprising:
   an anode;
   a sealed anode enclosure communicating with said anode and containing an organic fuel solution that is at least 4.4 M formic acid, said anode enclosure having a gas remover comprising a plurality of passages that are configured to allow passage of $CO_2$ from said enclosure while substantially preventing passage of said organic fuel solution, said plurality of passages positioned to promote circulation of said organic fuel solution as gas travels therethrough, said organic fuel solution contained in said sealed anode enclosure being free from circulation by pumping;

a cathode communicating with an oxygen source;

a solid polymer electrolyte sandwiched between said anode and said cathode that is substantially impervious to said organic fuel solution; and, wherein said anode, said cathode, and said electrolyte are operative to generate power having a power density of at least 14 mW/cm$^2$ when operating at room temperature.

19. A passive direct organic fuel cell comprising:

an anode;

an anode enclosure communicating with said anode and containing an organic fuel solution that is at least 8.8 M formic acid, said anode enclosure having a gas remover comprising a plurality of passages that are configured to allow passage of $CO_2$ from said enclosure while substantially preventing passage of said organic fuel solution, said plurality of passages positioned to promote circulation of said organic fuel solution as gas travels therethrough;

a cathode communicating with an oxygen source;

a solid polymer electrolyte sandwiched between said anode and said cathode that is substantially impervious to said organic fuel solution; and, wherein said anode, said cathode, and said electrolyte are operative to generate power having a power density of at least 10 mW/cm$^2$ at a constant voltage of 0.26 V when operating at room temperature for a period of at least 3 hours with no more than about 0.6 cc of said fuel solution.

* * * * *

UNITED STATES PATENT AND TRADEMARK OFFICE
CERTIFICATE OF CORRECTION

| | | |
|---|---|---|
| PATENT NO. | : 7,282,282 B2 | Page 1 of 1 |
| APPLICATION NO. | : 10/664772 | |
| DATED | : October 16, 2007 | |
| INVENTOR(S) | : Richard I. Masel et al. | |

It is certified that error appears in the above-identified patent and that said Letters Patent is hereby corrected as shown below:

In the References Cited item 56

Page 2, Col. 1, line 15 U.S. Patent Documents-Continued:

Please insert the following reference:

--5,599,637    02/04/1997    Surampudi et al.--

Signed and Sealed this

Thirteenth Day of May, 2008

JON W. DUDAS
*Director of the United States Patent and Trademark Office*